United States Patent [19]

Bryan

[11] Patent Number: 4,700,501
[45] Date of Patent: Oct. 20, 1987

[54] COMBINED FISHING ROD AND FISHING LINE VIBRATOR

[76] Inventor: George Bryan, 1401 Kingston Rd., Perry, Ga. 31069

[21] Appl. No.: 15,928

[22] Filed: Feb. 18, 1987

[51] Int. Cl.⁴ ............................................. A01K 87/00
[52] U.S. Cl. ........................................ 43/19.2; 43/25; 43/26.1
[58] Field of Search ........................ 43/19.2, 25, 26.1; 128/36

[56] References Cited

U.S. PATENT DOCUMENTS

| | | | |
|---|---|---|---|
| 3,001,317 | 9/1961 | Bowghton | 43/19.2 |
| 3,549,920 | 12/1970 | Tavel | 128/36 |
| 3,623,481 | 11/1971 | Curran | 128/36 |
| 3,789,534 | 2/1974 | Yankaitas | 43/19.2 |

Primary Examiner—Kurt Rowan
Attorney, Agent, or Firm—Diller, Ramik & Wight

[57] ABSTRACT

A combined fishing rod and fishing line vibrator includes a housing of plastic material defined by a pair of body halves maintained in tubular alignment by interengaged pins and bores to form a tubular body having axially opposite first and second ends closed by first and second caps. A radial shoulder in the first cap defines an eccentric-receiving chamber housing a weight carried eccentrically by a shaft of an electric motor housed between the first radial shoulder and a second radial shoulder defining an electric motor-receiving chamber adjacent batteries within a battery chamber, the second cap having electrical connection means for energizing the electric motor, and a fishing line loop carried by the tubular body whereby when the vibrator is connected to a fishing rod, the latter is vibrated directly through vibrations caused by the eccentric weight and the fishing line is vibrated through the fishing line loop.

10 Claims, 5 Drawing Figures

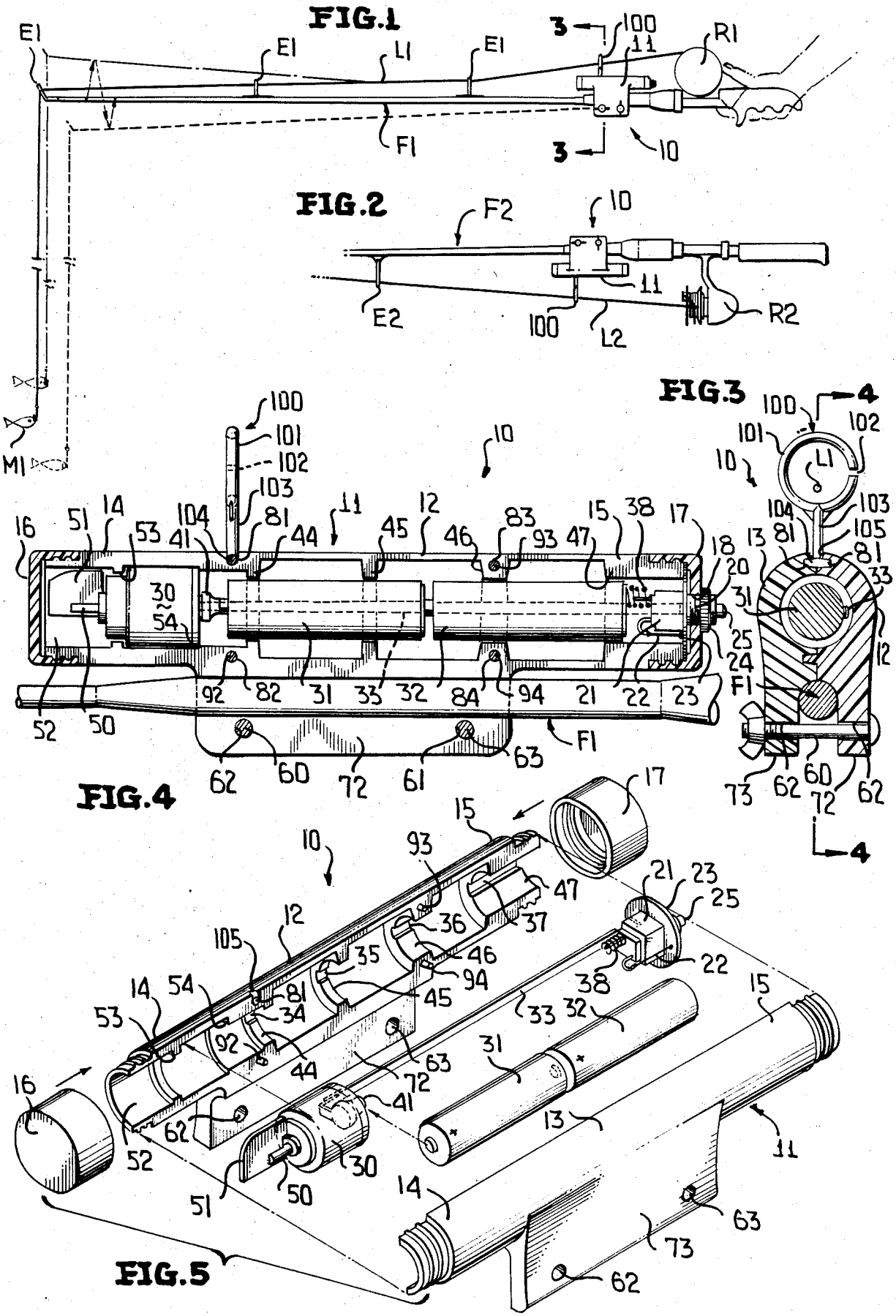

4,700,501

COMBINED FISHING ROD AND FISHING LINE VIBRATOR

BACKGROUND OF THE INVENTION

The present invention is directed to a novel combined fishing rod and fishing line vibrator which can be attached to a fishing rod and vibrations created by a rotating eccentric cause direct vibrations of the rod and also vibrations of an associated fishing line passed through a fishing line loop of the vibrator.

Vibrators, and particularly fishing rod or fishing line vibrators, are relatively common, and examples thereof are found in U.S. Pat. Nos. 3,789,534 to Thomas J. Yankaitis, issued Feb. 5, 1974; 2,908,103, R. H. Mertz, issued Oct. 13, 1959; 4,349,978, Charles R. Philip, issued Sept. 21, 1982; 3,835,570, Charles R. Philip issued Sept. 17, 1974; 4,020,582, Rodney G. Thelen, issued May 3, 1977; 3,981,095, Allen A. Shepherd, issued Sept. 21, 1976; 3,001,317, Nolan E. Boughton, issued Sept. 26, 1961; 4,177,594, Chin K. Kim, issued Dec. 11, 19749; 4,251,939, Claire L. Tiede, issued Feb. 24, 1981; and 4,100,695, James A. Blanchard issued July 18, 1978. The latter patents are not all-inclusive, but are certainly reflective of the status of the prior art and, of course, the deficiencies thereof which include complexity, cumbersomeness of design, costly manufacture, etc. The prior art patents basically reflect the absence of an easily manufactured, low-cost, easy to use, versatile and fail-safe vibrator which both (1) directly vibrates a fishing rod through the connection of the vibrator housing to the fishing rod and (2) directly vibrates the fishing line through a fishing line loop which is directly vibrated by the vibrator housing.

SUMMARY OF THE INVENTION

In keeping with the foregoing, a primary object of this invention is to provide a novel combined fishing rod and fishing line vibrator which includes a housing preferably formed of two semi-cylindrical bodies or halves which collectively are interengaged by pins and bores to define a tubular body having axially opposite first and second ends closed by respective first and second caps, a pair of radial shoulders within the tubular body adjacent the first end, an eccentric-receiving chamber between the first cap and a first of the radial shoulders housing therein an eccentric driven by an electric motor which is in turn housed in an electric motor-receiving chamber defined between the pair of radial shoulders, the second cap defining with the electric motor a battery-receiving chamber carry batteries operative through an electric switch of the second cap for energizing or de-energizing the electric motor, and a fishing line loop carried by the tubular body for receiving therethrough a fishing line whereby upon the vibrator being connected to a fishing rod, the rotation of the eccentric (1) creates vibrations directly transferred to the fishing rod and (2) creates vibrations directly transferred to the fishing line through the fishing line loop.

Still another object of this invention is to provide a novel combined fishing rod and fishing line vibrator wherein the housing includes connecting means operative to secure the vibrator either superposed above or suspended below an associated fishing rod.

Yet another object of this invention is to provide a novel combined fishing rod and fishing line vibrator wherein the fishing line loop includes a loop portion having a slot through which the fishing line can be passed into or out of the loop portion and a supporting stem, the supporting stem having oppositely directed feet, and the feet being received in bores of the tubular housing for retaining the supporting stem generally radially relative to an axis of the tubular body.

Still another object of this invention is to provide a novel combined fishing rod and fishing line vibrator as aforesaid wherein flange means are provided within the battery housing for maintaining at least a pair of batteries in axial aligned relationship.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a side elevational view of a novel combined fishing rod and fishing line vibrator, and illustrates the manner in which the same is attached to a fishing rod in superposed relationship thereto.

FIG. 2 is a fragmentary side elevational view similar to FIG. 1, but illustrates the manner in which the rod and line vibrator is attached in suspended relationship to a fishing rod.

FIG. 3 is an enlarged cross-sectional view taken generally along line 3—3 of FIG. 1, and illustrates the manner in which the rod and line vibrator is formed of two halves or bodies and carries a fishing line loop.

FIG. 4 is a cross-sectional view taken generally along line 4—4 of FIG. 3, and illustrates further details of a tubular housing of the rod and line vibrator together with an electric motor, and a weight carried eccentrically by a rotatable shaft of the electric motor, a pair of axial aligned batteries, and an associated switch and electrical connections.

FIG. 5 is a exploded perspective view of the rod and line vibrator, and illustrates the two generally identical mirrorimage halves and the identical end caps therefor.

DESCRIPTION OF THE PREFERRED EMBODIMENTS

A novel combined fishing rod and fishing line vibrator 10 is shown in FIGS. 1 and 2 attached to superposed and suspended relationship, respectively, to fishing rods F1 and F2. The fishing rod F1 carries a casting reel R1 having wound thereon fishing line L1 which passes through eyes E1 and carries conventional natural bait, such as a minnow M1. The fishing rod F2 does not include a casting reel R1, as in the case of FIG. 1, but instead has secured thereto an open face spinning reel R2 from which line L2 can be cast or reeled-in as it passes through eyes E2. In each case both the rods F1 and F2 and the lines L1, L2 are directly vibrated by the combined fishing rod and fishing line vibrator 10 in order to automatically jiggle, wiggle or impart motion to the minnows M1 or similar live bait, be the latter truly "live" or "dead". If the live bait M1 is lethargic, the vibrations imparted thereto generally prompts the bait into desired activity which is, of course, highly influential in terms of fishing success, since most fish, particularly game fish, are more attracted to active, moving bait than the opposite. Thus, should the bait or minnows M1 be other than active, the vibrations impart thereto a characteristic erratic motion which is highly attractive to fish and could otherwise transform a day of fishing doldrums into a productive fish-catching experience.

The combined fishing rod and fishing line vibrator 10 includes a housing 11 formed of two halves or bodies including a right-side housing half or body 12 and a left-side housing half or body 13 which are each preferably constructed from injection molded plastic material, such as polyethylene, and are virtually mirror images of each other. The halves 12, 13 are generally semi-cylindrical in overall configuration and when united impart a generally overall cylindrical or tubular configuration to the housing or tubular body 11, as is most apparent from FIGS. 3 and 5 of the drawings.

The housing 11 of the vibrator 10 includes a first or forward end 14 and a second or rear end 15, each of which includes exterior threads (unnumbered) upon which are threaded respective threaded caps 16, 17. The caps 16, 17 are identical except that the cap 17 has an axial bore 18 which receives a threaded stem 20 of an electric switch 21 whose housing (unnumbered) is grounded by a wire 22 to a metallic washer 23. A decorative nut 24 is threaded upon the threads (unnumbered) of the stem 20 to hold the switch 21 assembled to the cap 12. A switch button 25 can be manually manipulated between its "on" and "off" positions to energize an electric motor 30 by means of a pair of batteries 31, 32 in a conventional manner. While the switch 21 is preferably an "on-off" switch, the same may be a variable speed switch which can be adjusted to regulate the speed of rotation of the motor 30 and, thus, vary the frequency of vibrations of the vibrator 10, as will be more apparent hereinafter.

A conductor or wire 33 is housed in a number of aligned slots 34 through 37 (FIG. 5) formed in flanges or ribs 44 through 47, respectively, of the housing half 12. The left end, as viewed in FIG. 5, of the conductor 33 is connected in a conventional manner to the electric motor 30 while the right-hand end, again as viewed in FIG. 5, will contact the washer 23 when the cap 17 is threaded on the end 15. A coil spring 38 carried by the housing (unnumbered) of the switch 21 urges the batteries 31, 32 into contact with each other and with an axial connection 41 of the electric motor 30. The latter establishes a direct current path of travel for current when the switch button 25 is moved to its "on" position resulting in the energization of the motor 30, the rotation of an axial shaft 50 thereof, and the rotation of a weight 51 carried by the shaft 50 and housed within an eccentric-receiving chamber 52 defined between the cap 16 and one of a pair of radial flanges, ribs or shoulders 53, 54. The motor 30 is, therefore, firmly held between the shoulders 53, 54 whereas the eccentric 51 freely rotates in the eccentric-receiving chamber 52 which, of course, due to the eccentric mounting thereof results in the vibration of the housing 11. The latter vibration is directly transmitted to the fishing rod F1 or F2 through appropriate connecting means defined by two round-headed screws 60, 61 (FIG. 4) pass through openings 62, 63, respectively (FIG. 5), formed in flanges 72, 73 are the respective halves 12, 13. Wing nuts (unnumbered) are connected to the threaded ends of the screws 60, 61 to rigidly secure the vibrator 10 to the rods F1, F2.

Since the housing 11 vibrates, it is necessary that the two halves 12, 13 thereof be maintained in relatively rigid relationship to each other, and this is accomplished by forming four bores 81 through 84 (FIG. 4) in each of the housing halves 12, 13. Pins 92 through 94 (FIGS. 4 and 5) are seated in and glued to the bores 82 through 84, respectively, of the housing half 12 but are simply in frictional engagement with the respective bores 82 through 84 of the housing half 13. This interengagement of the pins and bores 92 through 94 and 82 through 84 maintains the halves 12, 13 in exact alignment, yet disassembly is readily achieved by simply removing both end caps 16, 17 and pulling the halves 12, 13 away from each other in diametrically opposite directions. This facilitates replacing the batteries 31, 32 and/or repairing or replacing the electric motor 30, the eccentric weight 51, the conductor 34, and an associated fishing line loop 100.

The fishing line loop 100 includes a generally circular loop portion 101 (FIG. 4) having a slot 102 through which readily passes the fishing line L1 or L2. A stem 103 is connected to the loop portion 101 and is disposed generally normal to the longitudinal axis (unnumbered) of the overall housing 11. The stem 103 has fixed thereto a pair of oppositely directed feet which are collectively designated by the reference numeral 104, and these feet are received in the bores 81, 81 of the halves 12, 13. A very short bore 105 (FIGS. 3 and 5) is formed in each of the halves 12, 13 and communicates with the bores 81, 81. The short bore 105 encircles the lower portion (unnumbered) of the stem 103 and maintains the overall fishing line loop 100 in relatively rigid relationship to the housing 11 except, of course, upon disassembling the halves 12, 13, the fishing line loop 100 can be readily removed therefrom. However, the rigid connection between the stem 103 and the leg 104 relative to the bores 105, 81 creates vibrations in the fishing line loop portion 100 during the rotation of the eccentric weight 51 which in turn imparts vibrations to the lines L1, L2 passing therethrough. Hence, as the eccentric 51 rotates, the vibrations created thereby are not only directly transmitted through the connecting means 60, 61, 62, 63, etc. to the rods F1, F2, but these same vibrations are directly transmitted from the housing 11 through the fishing line loop 100 and its loop portion 101 to the lines L1, L2, thus creating erratic motion to the bait/minnow M1. Thus, even at a constant speed of the motor 30, the fact that dual vibrations are imparted to the rods F1, F2 and the associated lines L1, L2 assures that the bait M1 is erratically moved in an inconsistant fashion which is far more effective than might otherwise be the case if the bait M1 were moved in a repetitious cycle. Obviously, additional inconsistency in the motion of the bait can be achieved by utilizing a variable speed switch, as noted earlier, in lieu of the simple "on-off" switch 21.

Although in a preferred embodiment of the invention as has been specifically illustrated and described herein, it is to be understood that minor variations may be made in the apparatus without departing from the spirit and scope of the invention, as defined in the appended claims.

I claim:

1. A combined fishing rod and fishing line vibrator comprising a housing defined by a tubular body having axially opposite open first and second ends, first and second caps closing said respective first and second ends, a pair of radial shoulders within said tubular body adjacent said first end, an eccentric-receiving chamber between said first cap and a first of said radial shoulders, an electric motor-receiving chamber between said radial shoulders, an electric motor in said electric motor-receiving chamber, a rotatable shaft projecting from said electric motor toward said first cap and supporting a weight eccentrically mounted and unbalanced with respect to the rotational axis of said shaft housed within said eccentric-receiving chamber, said second cap defining with said electric motor a battery-receiving chamber, electric switch means carried by said second cap for electrical connection to said electric motor, a fishing line loop fixedly secured to said tubular body for receiving a fishing line therein, and means for connecting said housing to a fishing rod whereby the rotating eccentric weight creates vibrations transferred directly to said rod through said connecting means and to a fishing line through said fishing line loop.

2. The combined fishing rod and fishing line vibrator as defined in claim 1 wherein said connecting means is operative to secure said housing superposed above or suspended below an associated fishing rod.

3. The combined fishing rod and fishing line vibrator as defined in claim 1 wherein said fishing line loop includes a loop portion having a slot adapted to pass therethrough a fishing line and a supporting stem, and means for securing said supporting stem to said housing.

4. The combined fishing rod and fishing line vibrator as defined in claim 1 wherein said fishing line loop includes a loop portion having a slot adapted to receive a fishing line therethrough and a supporting stem, means for securing said stem to said housing, and said stem securing means are a pair of oppositely directed feet received in axially aligned bores of said tubular body.

5. The combined fishing rod and fishing line vibrator as defined in claim 1 wherein said tubular body is formed of two generally semi-cylindrical halves, and a plurality of interengaged pins and bores maintain said body halves in aligned relationship to define the generally overall tubular configuration of said tubular body.

6. The combined fishing rod and fishing line vibrator as defined in claim 1 wherein said tubular body is formed of two generally semi-cylindrical halves, a plurality of interengaged pins and bores maintaining said body halves in generally aligned relationship to maintain said tubular body in its generally tubular configuration, a plurality of radially inwardly directed flanges in part defining said battery-receiving chamber, and said last-mentioned flanges being spaced and aligned to maintain two batteries in axially aligned relationship between said electric motor and said second cap.

7. The combined fishing rod and fishing line vibrator as defined in claim 5 wherein said fishing line loop includes a loop portion having a slot adapted to pass therethrough a fishing line and supporting stem, and means for securing said supporting stem to said housing.

8. The combined fishing rod and fishing line vibrator as defined in claim 5 wherein said fishing line loop includes a loop portion having a slot adapted to receive a fishing line therethrough and a supporting stem, means for securing said stem to said housing, and said stem securing means are a pair of oppositely directed feet received in axially aligned bores of said tubular body.

9. The combined fishing rod and fishing line vibrator as defined in claim 6 wherein said fishing line loop includes a loop portion having a slot adapted to pass therethrough a fishing line and a supporting stem, and means for securing said supporting stem to said housing.

10. The combined fishing rod and fishing line vibrator as defined in claim 6 wherein said fishing line loop includes a loop portion having a slot adapted to receive a fishing line therethrough and a supporting stem, means for securing said stem to said housing, and said stem securing means are a pair of oppositely directed feet received in axially aligned bores of said tubular body.

* * * * *